United States Patent
Shibata et al.

(10) Patent No.: US 12,494,840 B2
(45) Date of Patent: Dec. 9, 2025

(54) COMMUNICATION RELAY APPARATUS, REMOTE CONTROL APPARATUS, SYSTEM, AREA CONTROL METHOD AND PROGRAM

(71) Applicant: SoftBank Corp., Tokyo (JP)

(72) Inventors: Yohei Shibata, Tokyo (JP); Wataru Takabatake, Tokyo (JP); Kenji Hoshino, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/554,205

(22) PCT Filed: Mar. 17, 2022

(86) PCT No.: PCT/JP2022/012441
§ 371 (c)(1),
(2) Date: Mar. 7, 2024

(87) PCT Pub. No.: WO2022/215487
PCT Pub. Date: Oct. 13, 2022

(65) Prior Publication Data
US 2025/0183993 A1    Jun. 5, 2025

(30) Foreign Application Priority Data
Apr. 9, 2021 (JP) ................................. 2021-066783

(51) Int. Cl.
*H04B 7/185* (2006.01)
*H04W 16/26* (2009.01)

(52) U.S. Cl.
CPC ........ *H04B 7/18504* (2013.01); *H04W 16/26* (2013.01)

(58) Field of Classification Search
CPC . H04W 84/06; B64C 39/024; B64U 2101/00; B64U 2101/20; B64U 2201/00; B64U 2201/20; B64U 10/00
See application file for complete search history.

(56) References Cited

U.S. PATENT DOCUMENTS

| | | | |
|---|---|---|---|
| 10,206,161 B2 | 2/2019 | Whelan et al. | |
| 2017/0324463 A1* | 11/2017 | Jalali | H04B 7/18502 |
| 2018/0109991 A1 | 4/2018 | Whelan et al. | |

FOREIGN PATENT DOCUMENTS

| | | |
|---|---|---|
| JP | 2005-295090 A | 10/2005 |
| JP | 2018-93478 A | 6/2018 |

(Continued)

OTHER PUBLICATIONS

Yohei Shibata, et al., "System Design of Gigabit HAPS Mobile Communications", IEEE Access, vol. 8, pp. 157995-158007, 2020.

(Continued)

*Primary Examiner* — Khalid W Shaheed
(74) *Attorney, Agent, or Firm* — Westborough IP Group, LLC

(57) ABSTRACT

It is to provide an aerial-floating type communication relay apparatus (HAPS) that can perform a dynamic area control capable of adapting to a change of distribution of terminal apparatuses in a service area configured with plural cells formed toward the ground, and that can suppress an increase in time required for area optimization. The aerial-staying type communication relay apparatus (HAPS) estimates positions of plural terminal apparatuses located in a service area, divides the service area into plural (M) subareas including plural cells, optimizes plural (L) kinds of antenna parameters of antenna for service link based on estimation results of the positions of plural terminal apparatuses for each of the subareas, and applies, to the antenna for service link, optimum values of the plural (L) kinds of antenna parameters after the optimization for each of the subareas is completed for all of the plural (M) subareas.

13 Claims, 10 Drawing Sheets

(56) References Cited

FOREIGN PATENT DOCUMENTS

WO    WO-2016028208 A1 *  2/2016  ......... G01S 5/02521
WO    WO 2019/235324 A1    12/2019

OTHER PUBLICATIONS

Yohei Shibata, et al., "Dynamic Cell Optimization for HAPS Multi-cell Configuration Considering User Distribution", IEICE Technical Report, vol. 120, No. 322, RCS2020-185, pp. 170-175, Jan. 2021.
International Search Report and Written Opinion Dated for PCT Application No. PCT/JP2022/012441, Apr. 26, 2022.
Notice for Reasons of Refusal for Japanese Patent Application No. JP 2021-066783, Dated Apr. 14, 2022.
Decision to Grant Patent for Japanese Application No. 2021-066783, dated Jun. 13, 2022.
Notice of Reasons for Refusal for Japanese Application No. 2021-066783, dated Apr. 14, 2022.
International Preliminary Report on Patentability Dated Oct. 10, 2023, for PCT Application No. PCT/JP2022/012441.
European Search Report Dated Oct. 18, 2024.
Zhi Lin, et al., "Robust Multi-Objective Beamforming for Integrated Satellite and High Altitude Platform Network With Imperfect Channel State Information", IEEE Transactions on Signal Processing, vol. 67, No. 24, Dec. 15, 2019.
European Office Action Dated May 7, 2025.
European Office Action Dated Oct. 13, 2025.

* cited by examiner

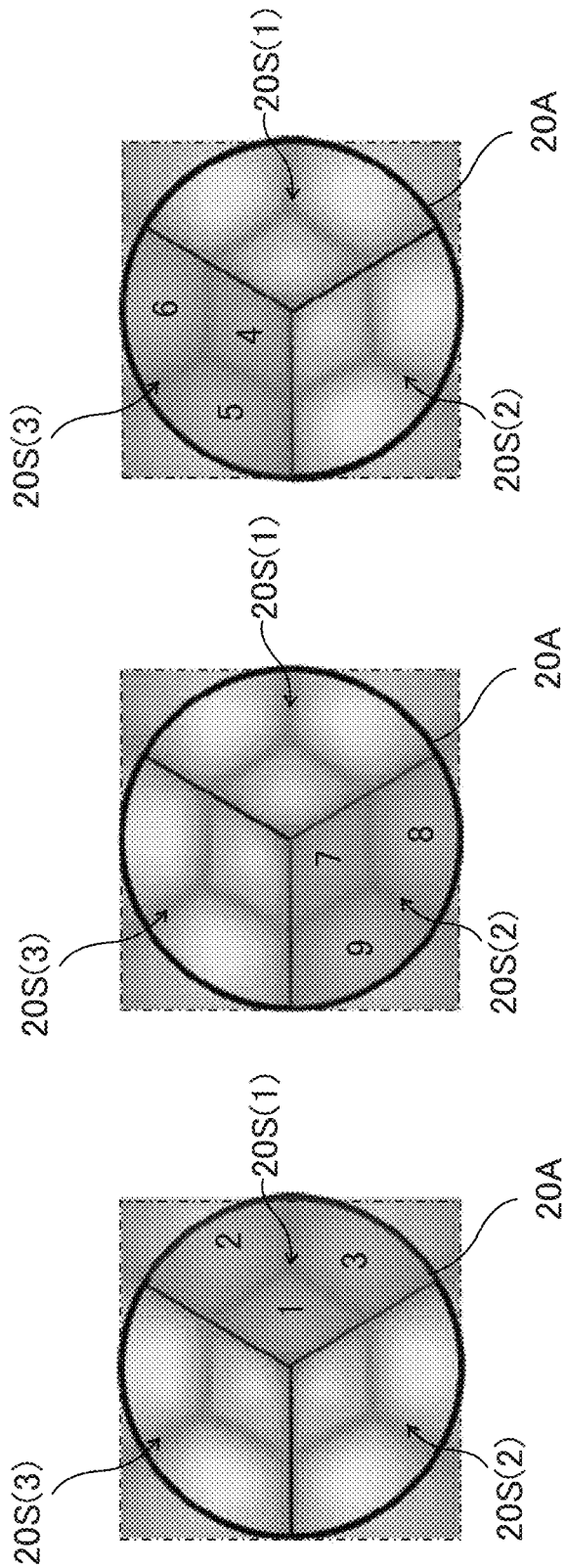

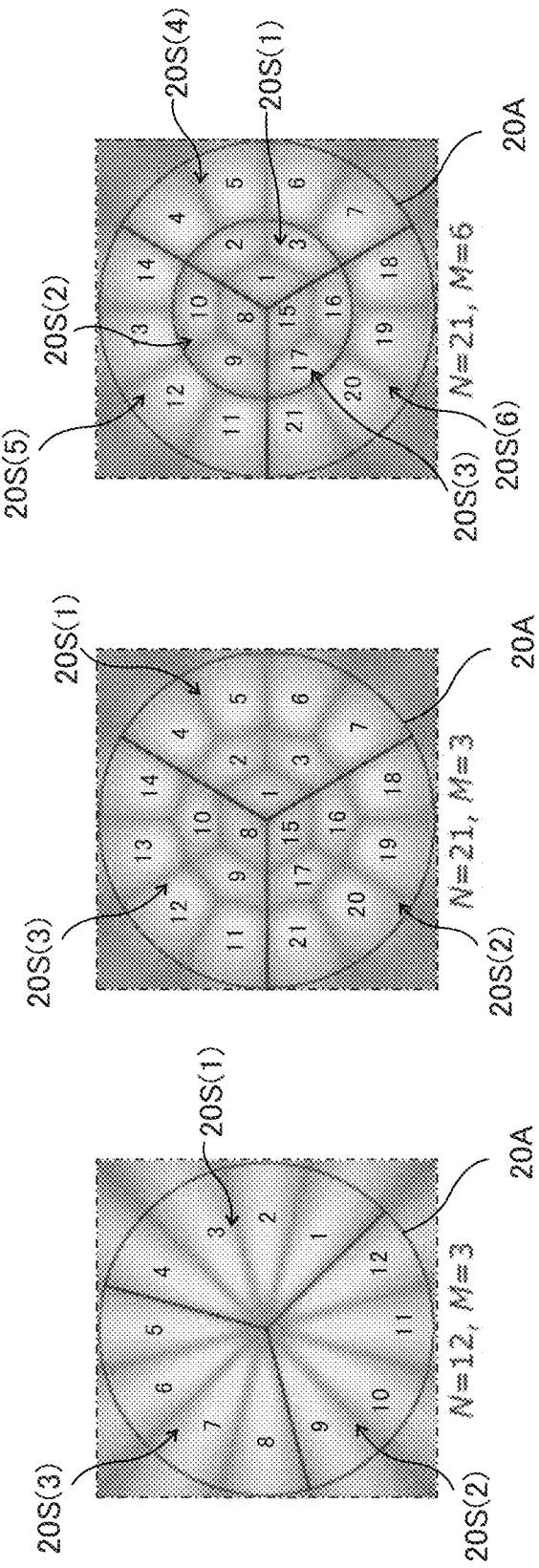

COMMUNICATION RELAY APPARATUS, REMOTE CONTROL APPARATUS, SYSTEM, AREA CONTROL METHOD AND PROGRAM

TECHNICAL FIELD

The present invention relates to an optimization of a service area configured with cells formed toward the ground by an aerial-staying type communication relay apparatus.

BACKGROUND ART

There is conventionally known a method for performing an area optimization that optimizes antenna parameters of service link so that desired communication quality (for example, throughput) can be obtained in an entire service area (hereinafter, also simply referred to as "area") formed on the ground by a communication relay apparatus such as a high-altitude platform station (HAPS) (also referred to as "high altitude pseudo satellite") that can float and stay in an airspace.

For example, Non-Patent Literature 1 discloses a method for performing an area optimization by assuming that the distribution of user apparatuses (hereinafter also referred to as "UEs") as terminal apparatuses in an area is a uniform distribution. Non-Patent Literature 2 discloses a method for performing an optimization for each cell so that desired communication quality (for example, throughput) can be obtained in the entire area when the area is configured with plural cells.

CITATION LIST

Non-Patent Literature

Non-Patent Literature 1: Y. Shibata, N. Kanazawa, M. Konishi, K. Hoshino, Y. Ohta and A. Nagate, "System Design of Gigabit HAPS Mobile Communications," in IEEE Access, vol. 8, pp. 157995-158007, 2020.

Non-Patent Literature 2: Yohei Shibata, Wataru Takabatake, Kenji Hoshino, Atsushi Nagate, "HAPS dynamic cell control algorithm considering user distribution in plural-cell configuration", IEICE Technical Report, vol. 120, no. 322, RCS2020-185, pp. 170-175, January 2021.

SUMMARY OF INVENTION

Technical Problem

In the method of Non-Patent Literature 2, although it can adapt to a non-uniform UE distribution in the area, there is a problem that the calculation becomes exponentially complicated, the amount of calculation increases and the time required for area optimization increases because the optimization is performed for each cell.

Solution to Problem

A communication relay apparatus according to an aspect of the present invention is an aerial-staying type communication relay apparatus having a relay communication station for relaying radio communication of terminal apparatuses located in plural (N) cells formed toward a service area on the ground and an antenna for service link. The communication relay apparatus comprises position estimation means for estimating positions of plural terminal apparatuses located in the service area, parameter optimization means for dividing the service area into plural (M) subareas including plural cells, and optimizing plural (L) kinds of antenna parameters of the antenna for service link, based on estimation results of the positions of plural terminal apparatuses, for each of the subareas, and parameter application means for applying, to the antenna for service link, optimum values of the plural (L) kinds of antenna parameters after the optimization for each of the subareas is completed for all of the plural (M) subareas.

A remote control apparatus according to another aspect of the present invention is a remote control apparatus capable of communicating with an aerial-staying type communication relay apparatus having a relay communication station for relaying radio communication of terminal apparatuses located in plural (N) cells formed toward a service area on the ground and an antenna for service link. The remote control apparatus comprises position estimation means for estimating positions of plural terminal apparatuses located in the service area, parameter optimization means for dividing the service area into plural (M) subareas including plural cells, and optimizing plural (L) kinds of antenna parameters of the antenna for service link, based on estimation results of the positions of plural terminal apparatuses for each of the subareas, and parameter transmission means for transmitting, to the communication relay apparatus, optimum values of the plural (L) kinds of antenna parameters after the optimization for each of the subareas is completed for all of the plural (M) subareas.

In the foregoing communication relay apparatus and the foregoing remote control apparatus, the parameter optimization means may sequentially select each of the plural (M) subareas, and optimize the plural (L) kinds of antenna parameters for each of the plural cells included in the selected subarea and parameters for determining directions of other subareas other than the selected subarea, based on the estimation results of the positions of plural terminal apparatuses.

In the foregoing communication relay apparatus and the foregoing remote control apparatus, the parameter optimization means may perform the parameter optimization for each of the subareas using a genetic algorithm.

In the foregoing communication relay apparatus and the foregoing remote control apparatus, the parameter optimization means may perform parameter optimization for each of the subareas plural times (T times) repeatedly.

In the foregoing communication relay apparatus and the foregoing remote control apparatus, the communication relay apparatus may perform the position estimation for the plural terminal apparatuses, the optimization for the antenna parameters and the application for the optimum values of the antenna parameters to the antenna for service link, periodically or when an amount of change in the distribution of the terminal apparatuses in the service area becomes larger than a predetermined amount of change.

In the foregoing communication relay apparatus, the relay communication station may comprise a base-station processing section that is connected to a mobile communication network via a feeder link between the communication relay apparatus and a gateway station on the ground and performs a baseband process.

In the foregoing communication relay apparatus, the relay communication station may comprise a repeater section that is connected to a base station apparatus via a feeder link between the communication relay apparatus and a gateway station on the ground and performs a radio relay.

A system according to yet another aspect of the present invention comprises any one of the foregoing remote control apparatuses, and an aerial-staying type communication relay apparatus that has a relay communication station for relaying radio communication of terminal apparatuses located in plural (N) cells formed toward a service area on the ground and an antenna for service link.

A method according to yet another aspect of the present invention is an area control method for a service area configured with plural (N) cells formed toward the ground from an aerial-staying type communication relay apparatus. The area control method includes estimating positions of plural terminal apparatuses located in the service area, dividing the service area into plural (M) subareas including plural cells respectively, and optimizing plural (L) kinds of antenna parameters of the antenna for service link based on estimation results of the positions of plural terminal apparatuses for each of the subareas, and applying, to the antenna for service link, optimum values of the plural (L) kinds of antenna parameters after the optimization for each of the subareas is completed for all of the plural (M) subareas.

A program according to yet another aspect of the present invention is a program executed by a computer or processor provided in an aerial-staying type communication relay apparatus having a relay communication station for relaying radio communication of terminal apparatuses located in plural (N) cells formed toward a service area on the ground and an antenna for service link. The program includes a program code for estimating positions of plural terminal apparatuses located in the service area, a program code for dividing the service area into plural (M) subareas including plural cells respectively, and optimizing plural (L) kinds of antenna parameters of the antenna for service link based on estimation results of the positions of plural terminal apparatuses for each of the subareas, and a program code for applying, to the antenna for service link, optimum values of the plural (L) kinds of antenna parameters after the optimization for each of the subareas is completed for all of the plural (M) subareas.

A program according to yet another aspect of the present invention is a program executed by a computer or processor provided in a remote control apparatus capable of communicating with an aerial-staying type communication relay apparatus having a relay communication station for relaying radio communication of terminal apparatuses located in plural (N) cells formed toward a service area on the ground and an antenna for service link. The program includes a program code for estimating positions of plural terminal apparatuses located in the service area, a program code for dividing the service area into plural (M) subareas including plural cells, and optimizing plural (L) kinds of antenna parameters of the antenna for service link based on estimation results of the positions of plural terminal apparatuses for each of the subareas, and a program code for transmitting, to the communication relay apparatus, optimum values of the plural (L) kinds of antenna parameters after the optimization for each of the subareas is completed for all of the plural (M) subareas.

Advantageous Effects of Invention

According to the present invention, it is possible to perform a dynamic area control capable of coping with a change of distribution of terminal apparatuses in a service area configured with plural cells formed from an aerial-floating type communication relay apparatus toward the ground, and to suppress an increase of time required for the area optimization.

BRIEF DESCRIPTION OF DRAWINGS

FIG. 9A is an illustration showing an example of switching subareas targeted for the optimization of antenna parameters in the dynamic area control of FIG. 8.

FIG. 9B is an illustration showing an example of switching subareas targeted for the optimization of antenna parameters in the dynamic area control of FIG. 8.

FIG. 9C is an illustration showing an example of switching subareas targeted for the optimization of antenna parameters in the dynamic area control of FIG. 8.

FIG. 10A is an illustration showing another example of area division for dividing a service area into plural subareas.

FIG. 10B is an illustration showing another example of area division for dividing a service area into plural subareas.

FIG. 10C is an illustration showing another example of area division for dividing a service area into plural subareas.

DESCRIPTION OF EMBODIMENTS

Hereinafter, embodiments of the present invention are described with reference to the drawings.

A system according to an embodiment described herein is a dynamic-area control system capable of coping with a change of user distribution while suppressing an increase of time required for the area optimization, by estimating a position of user's UE (terminal apparatus) in a target area where a HAPS relays a communication, dividing the entire area into plural subareas and selecting the subarea sequentially, and optimizing antenna parameters in the selected subarea based on the estimated position information on the UE, in a HAPS-mobile communication system configured with multiple cells.

Figure 1:
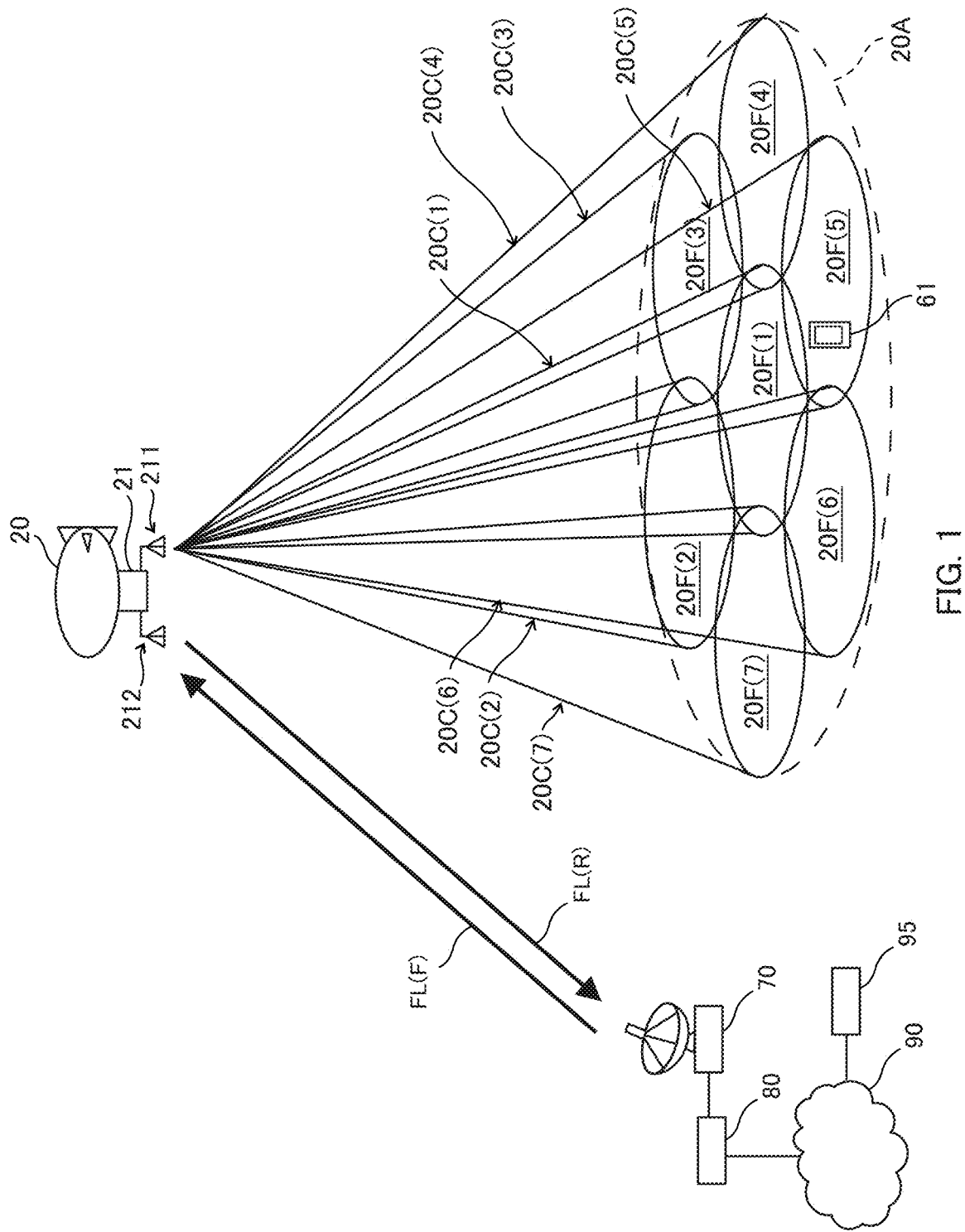
FIG. 1 is an illustration showing an example of a configuration of a communication system according to an embodiment.

FIG. 1 is an illustration showing an example of a configuration of a communication system according to an embodiment of the present invention. The communication system according to the present embodiment is suitable for realizing a three-dimensional network for mobile communication of fifth-generation or subsequent-generation, which supports simultaneous connection to a large number of terminal apparatuses (hereinafter referred to as "UEs"), low delay, and the like. The mobile communication standards applicable to communication systems, radio relay stations, base stations, repeaters and UEs disclosed in the present specification include the fifth-generation mobile communication standards and the next generation mobile communication standards after the fifth-generation.

As shown in FIG. 1, the communication system is provided with a High Altitude Platform Station (HAPS) (also called "high altitude pseudo satellite" or "stratified platform") 20 as an aerial-floating type communication relay apparatus (radio relay apparatus). The HAPS 20 is located in an airspace at a predetermined altitude and forms a three-dimensional cell (three-dimensional area) in a cell-formation target airspace at a predetermined altitude. The HAPS 20 is an airship as a floating object that is controlled by autonomous control or external control so as to float or fly and be located in an airspace (floating airspace) with high altitude of 100 [km] or less from the ground level or the sea level, and a relay communication station 21 is mounted on the airship.

The airspace in which the HAPS 20 is located is, for example, a stratospheric airspace with altitude of 11 [km] or more and 50 [km] or less on the ground (or on the water such as the sea or lake). The airspace may be an airspace with altitude of 15 [km] or more and 25 [km] or less where weather conditions are relatively stable, and may be an airspace with altitude of about 20 [km] in particular.

The cell-formation target airspace, where is a target airspace for forming a three-dimensional cell with one or two or more HAPSs in the communication system of the present embodiment, is an airspace in a predetermined altitude range (for example, altitude range of 50 [m] or more and 1000 [m] or less) located between the airspace where the HAPS 20 is located and a cell formation area near the ground level covered by a base station (for example, eNodeB in the LTE or gNodeB in the next-generation) such as a conventional macro-cell base station.

It is noted that, the cell-formation target airspace, where the three-dimensional cell of the present embodiment is formed, may be an upper airspace over seas, rivers or lakes. Further, the three-dimensional cell formed by the HAPS 20 may be formed so as to reach the ground level or the sea level, so as to be able to also communicate with a UE 61 located on the ground or on the sea.

The relay communication station 21 of the HAPS 20 forms plural beams for wirelessly communicating with the UE 61 that is a mobile station, toward the ground, by an antenna for service link (hereinafter referred to as "SL antenna") 211. The SL antenna 211 is, for example, a single array antenna or plural array antennas capable of forming plural beams toward the ground, in which plural antenna elements are disposed two-dimensionally or three-dimensionally.

The UE 61 may be a communication terminal module incorporated in a drone that is an aircraft such as a small helicopter capable of remotely steering, or may be a user apparatus used by a user in an airplane. The area through which the beam passes in the cell-formation target airspace is a three-dimensional cell. Plural beams adjacent to each other in the cell-formation target airspace may partially overlap.

The relay communication station 21 of the HAPS 20 is, for example, a base station that wirelessly communicates with a gateway station (also referred to as a "feeder station") 70 as a relay station connected to a core network on the ground (or on the sea) side, or a slave repeater that wirelessly communicates with a feeder station (master repeater) 70 as a relay station connected to a base station apparatus on the ground (or on the sea) side. In the following embodiments, a case is described, in which the relay communication station 21 is a slave repeater is described.

The relay communication station 21 of the HAPS 20 is connected to a core network of a mobile communication network 90 via the gateway station (hereinafter referred to as "GW station") 70 capable of performing a radio communication by an antenna for feeder link (hereinafter referred to as "FL antenna") 212, which is disposed on the ground or on the sea, and a base station apparatus 80, and is further connected to the Internet that is an external communication network. The FL antenna 212 may be, for example, a single array antenna or plural array antennas in which plural antenna elements are disposed two-dimensionally or three-dimensionally. The feeder link FL (F) in the figure is a forward link from the GW station 70 toward the UE 61 via the HAPS 20, and the feeder link FL(R) is a reverse link from the UE 61 toward the GW station 70 via the HAPS 20.

The HAPS 20 may autonomously control its own floating movement (flight) and a process in the relay communication station 21 by executing a control program by a control section configured with a computer or a processor, etc. built in the inside. For example, the HAPS 20 can autonomously perform the dynamic area control described later. The HAPS 20 may obtain its own current position information (for example, GPS position information), position control information (for example, flight schedule information) stored in advance, position information on another HAPS located in a peripheral space, or the like, and may autonomously control the floating movement (flight) and the process in the relay communication station 21 based on these kinds of information.

The control section of HAPS 20 also functions as means for the following C1 to C3 by executing the control program.
C1. Position estimation means for estimating positions of plural UEs 61 located in a service area 20A.
C2. Parameter optimization means for dividing the service area 20A into plural (M) subareas 20S including plural cells 20C and optimizing plural (L) kinds of antenna parameters of the SL antenna 211 for each of the subareas 20S based on the estimation results of the positions of plural UEs 61.
C3. Parameter application means for applying, to the SL antenna 211, optimum values of the plural (L) kinds of antenna parameters after the optimization for each of the subareas 20S is completed for all of the plural (M) subareas 20S.

Herein, the positions of the plural UEs 61 can be estimated using, for example, GNSS position information or MR (measurement report) fed back from each UE 61.

The floating movement (flight) of the HAPS 20 and the process at the relay communication station 21 may be controlled by a remote control apparatus 95 provided in a communication center of the mobile communication network 90 or the like. The remote control apparatus 95 can be configured with, for example, a computer apparatus such as a PC, a server, or the like. The HAPS 20 may incorporate a communication terminal apparatus for control (for example, a mobile communication module) so that it can receive control information from the remote control apparatus 95 and transmit various kinds of information such as monitoring information to the remote control apparatus 95, and may be assigned terminal identification information (for example, IP address, telephone number, etc.) so that it can be identified from the remote control apparatus 95. The MAC address of the communication interface may be used to identify the communication terminal apparatus for control.

The remote control apparatus 95 can perform a dynamic area control described below by cooperating with the HAPS 20, for example.

The HAPS 20 may transmit information relating to floating movements (flights) of the own HAPS or surrounding HAPS and the process in the relay communication station 21, and monitoring information such as position information of the HAPS 20, status information of the HAPS 20 and observation data obtained by various kinds of sensors, to a predetermined destination such as the remote control apparatus 95, etc. The control information may include target-flight route information of the HAPS. The monitoring information may include at least one of information on current position, flight-route history information, velocity relative to the air, velocity relative to the ground and propulsion direction of the HAPS 20, wind velocity and wind direction of airflow around the HAPS 20, and atmospheric pressure and temperature around the HAPS 20.

Duplex methods of uplink and downlink for radio communication with the relay communication station 21 and the UE 61 are not limited to specific methods, and may be, for example, a time division duplex method (Time Division Duplex: TDD) or a frequency division duplex method (Frequency Division Duplex: FDD). An access method for radio communication with the relay communication station 21 and the UE 61 is not limited to the specific method, but may be, for example, FDMA (Frequency Division Multiple Access) method, TDMA (Time Division Multiple Access) method, CDMA (Code Division Multiple Access) method, or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using plural antennas for both of transmission and reception. The MIMO technology may be an SU-MIMO (Single-User MIMO) technology in which one base station transmits plural signals to one terminal apparatus on the same time/same frequency, and may be an MU-MIMO (Multi-User MIMO) technology in which one base station transmits signals to plural different communication terminal apparatuses on the same time with the same frequency or plural different base stations transmit signals to one terminal apparatus on the same time with the same frequency.

In the following embodiments, although a case is illustrated and described, in which a communication relay apparatus having the relay communication station 21 that wirelessly communicates with the UE 61 is an unmanned-airship type HAPS 20, the communication relay apparatus may be a solar plane, a drone (unmanned aerial vehicle), or other type of flying object with the relay communication station 21 mounted thereon. The following embodiments can be similarly applied to other aerial-floating types of communication relay apparatuses other than the HAPS.

In the HAPS mobile communication system of the configuration described above, for example, a signal from the base station apparatus 80 is relayed by the GW station 70 and the HAPS 20, and communication services can be provided to the UE 61 on the ground. The present communication system performs an area optimization for optimizing the antenna parameters of the SL antenna 211 so that a desired communication quality (for example, throughput) can be obtained in the entire service area (hereinafter also simply referred to as "area") 20A configured with plural cells 20C(1) to 20C(7) formed toward the ground by the HAPS 20.

The distribution of UEs in the foregoing area varies according to location and time. For example, at the event of a disaster, there is a possibility that UEs are concentrated in a part in the area and a sudden increase in traffic occurs. In order to cope with such non-uniform UE distribution in the area that changes depending on location and time, the dynamic area control for dynamically performing the foregoing area optimization for each of the cells forming the area 20A is performed in the present embodiment.

Figure 2:
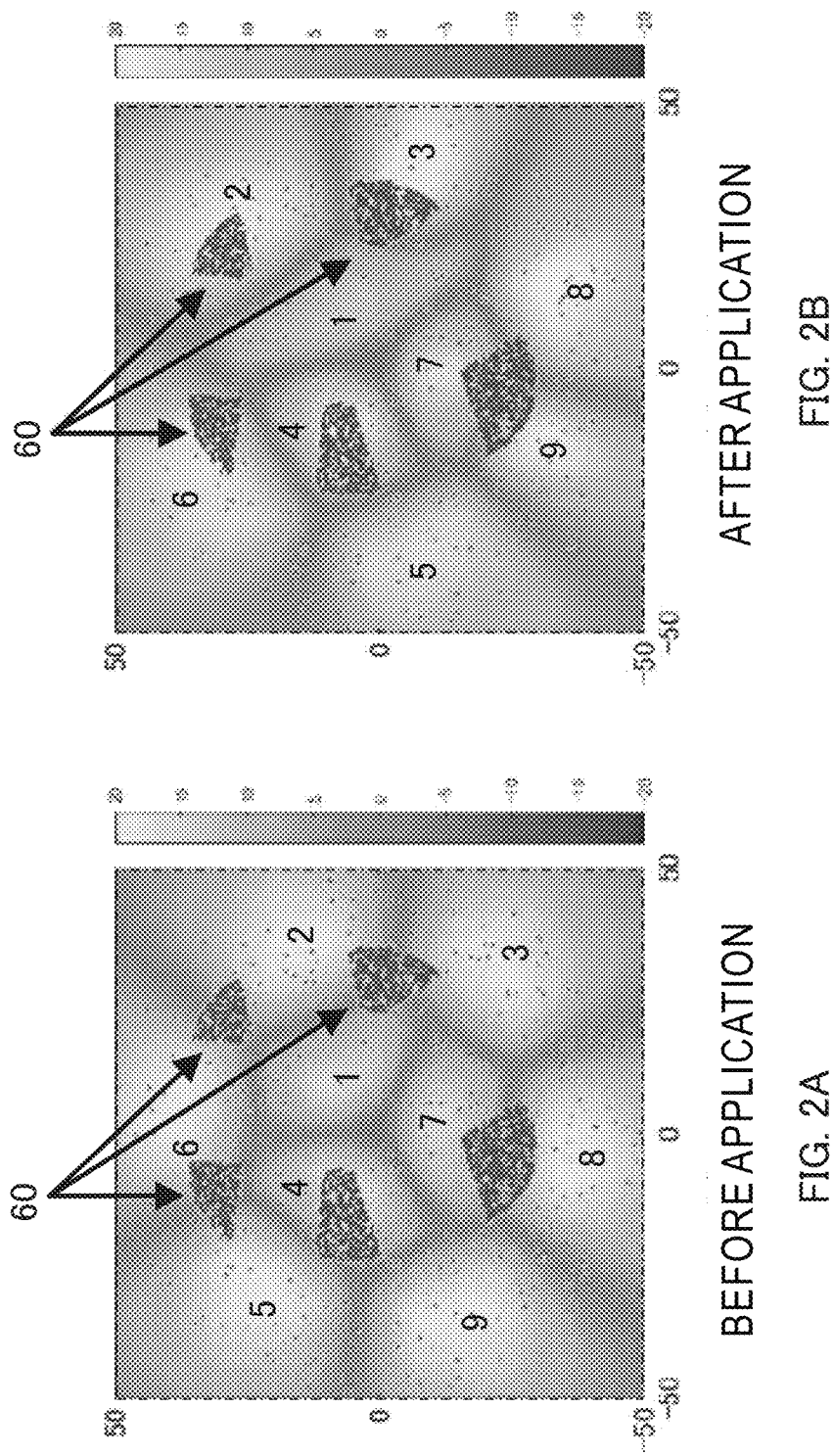
FIG. 2A is an illustration of cell placement before and after applying an area optimization for each cell in a service area configured with nine cells.
FIG. 2B is an illustration of cell placement before and after applying an area optimization for each cell in a service area configured with nine cells.

Each of FIG. 2A and FIG. 2B is an illustration of cell placement before and after applying the area optimization for each cell in a service area configured with nine cells. Nine sections with high brightness in FIG. 2 are respectively the locations of the cells, and each of numeric characters in these sections is number for identifying each cell. In FIG. 2, the positions of UEs in the area are indicated by small dots. In the examples of FIG. 2A and FIG. 2B, UE high-density sections are generated in five places in the area, in which the UE density is partially high. Although the three places of the UE high-density sections 60 indicated by the arrows in the figure do not correspond to the cells before applying the area optimization for each cell in FIG. 2A, the cells correspond to the 3 places of UE high-density sections 60 after applying the area optimization for each cell in FIG. 2B.

In this way, the positions of cells can be corresponded to the non-uniform UE distribution in the area by performing the area optimization for each cell. However, in case of performing the area optimization that optimizes plural antenna parameters of the SL antenna 211 for each cell, due to an increase in the number of cells in the area and the number of antenna parameters, the calculations for optimizing the antenna parameters for each cell becomes exponentially more complex, the amount of calculation increases and the time required for area optimization increases.

For example, in an area optimization of an area configured with N cells, as plural (L) kinds of antenna parameters for an arbitrary i-th cell i in the area, the following four kinds of antenna parameters A to D are defined and used.

Figure 3:
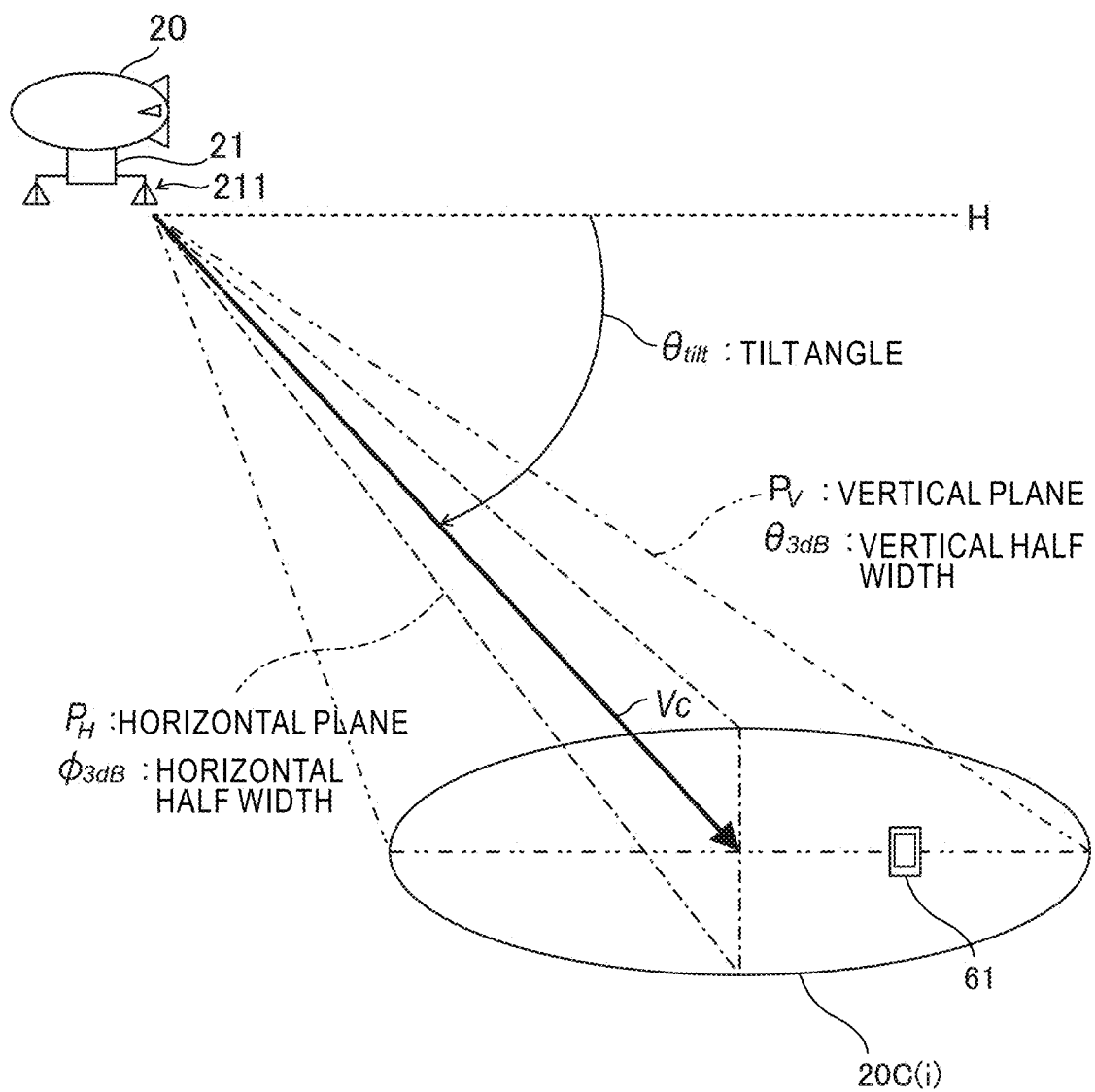
FIG. 3 is an illustration of an antenna tilt angle, a vertical half width and a horizontal half width as antenna parameters used for the area optimization.

A. Tilt angle $\theta_{tilt,i}$
B. Vertical half width $\theta_{3dB,i}$
C. Horizontal half width $\varphi_{3dB,i}$
D. Cell horizontal orientation direction $\omega_i$ As shown in FIG. 3, the tilt angle $\theta_{tilt,i}$ is an angle from the horizontal direction H of the vector Vc from the SL antenna 211 of the HAPS 20 toward the center of the target i-th cell 20(i). The vertical half width $\theta_{3dB,i}$ is an angular width between two points at which the gain of the beam is reduced by 3 dB from the maximum gain at the center of the main beam in the vertical plane $P_V$ including the vector Vc toward the center of the i-th cell 20(i). The horizontal half width $\varphi_{3dB,i}$ is an angular width between two points at which the gain of the beam is reduced by 3 dB from the maximum gain at the center of the main beam in the horizontal plane $P_H$ including the vector Vc toward the center of the i-th cell 20(i).

Figure 4:
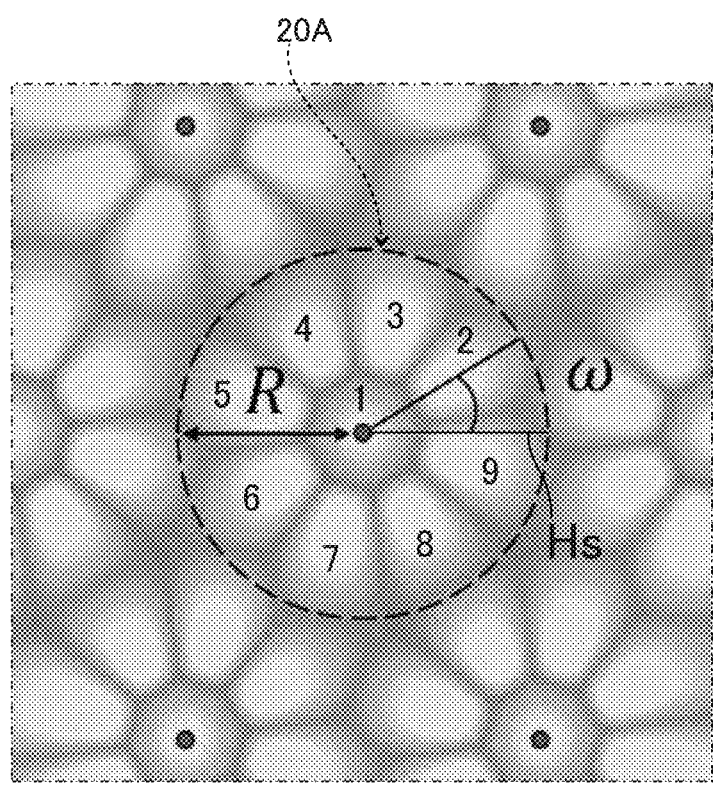
FIG. 4 is an illustration of horizontal directions for subareas used for the area optimization.

As shown in FIG. 4, the i-th cell horizontal orientation direction $\omega_i$ is an angle in a direction passing through the center of the target cell (cell 2 in the illustrated example) from the reference point with reference to the predetermined reference horizontal direction Hs, in a horizontal plane including the position of the SL antenna 211 of the HAPS 20 (center of area 20A with radius R in the illustrated example) as a reference point.

Figure 5:
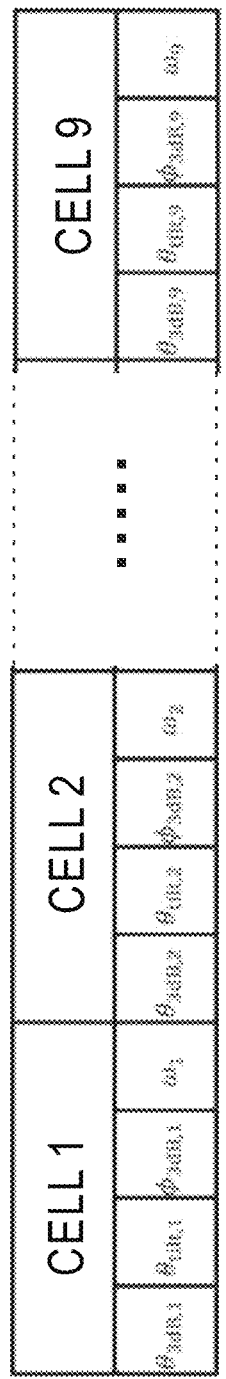
FIG. 5 is an illustration showing a list of antenna parameters to be optimized, which are applied to each cell.

In the case of four kinds of antenna parameters A to D, assuming that the number of cells is N, the total number of antenna parameters that are targeted for optimization is 4N. For example, in case that the number of cells is nine, the total number of antenna parameters that are targeted for optimization is thirty-six as shown in FIG. 5. Assuming that the number of candidates for each antenna parameter is ten, the number of combinations of the candidates of antenna parameters to be optimized is $10^{4N}$. In this way, the number of combinations of the candidates of the antenna parameters to be optimized increases exponentially as the number of cells N increases, and the calculations become exponentially more complex because the optimization is performed for each cell. Therefore, the amount of calculation for the area optimization increases, and the time required for the area optimization increases.

Therefore, in the present embodiment, the service area 20A is divided into plural (M) subareas including plural cells, and plural (L) kinds (four kinds in the foregoing example) of antenna parameters are optimized for each of the subareas.

Figure 6:
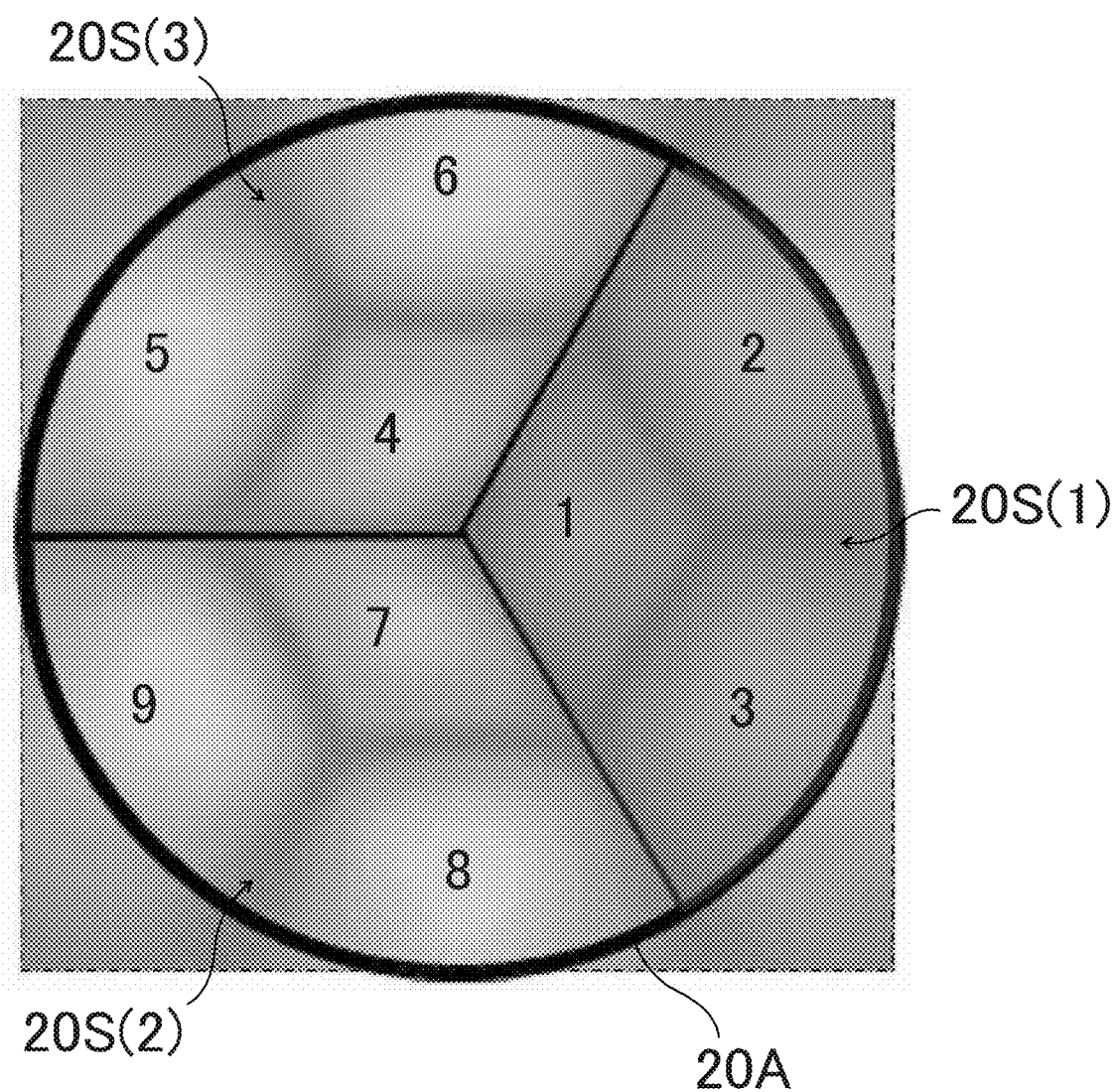
FIG. 6 is an illustration showing an example of area division for dividing a service area into plural subareas.

For example, in case that the number of cells N is nine and the number M of subareas 20S(1) to 20S(3), which are divided from the area 20A, is three as shown in FIG. 6, each of the subareas is configured with N/M=3 cells. It is noted that, in FIG. 6, the high-brightness sections are cells, and the numerical character in each cell is identification number of the cell (the same applies to FIG. 9A to FIG. 9C and FIG. 10A to FIG. 10C described below).

Figure 7:
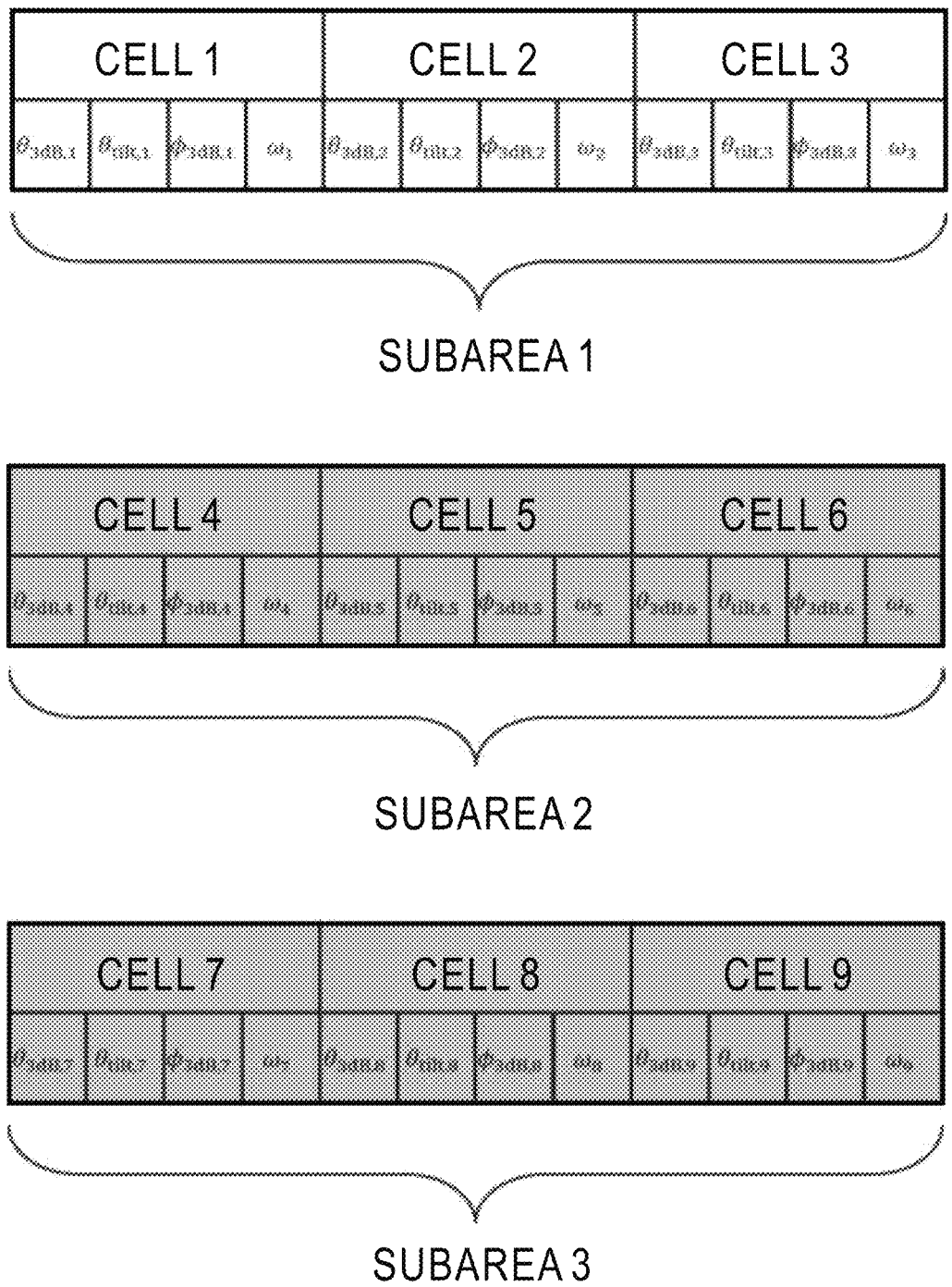
FIG. 7 is an illustration showing a list of antenna parameters included in each of the subareas after dividing.

In the example of FIG. 6, the number of antenna parameters in each of the subareas is twelve (see FIG. 7). Herein, in the case of optimizing the antenna parameters for the subarea 1 including the cell 1 to the cell 3, the antenna parameters of the remaining the subareas 2 and 3 are fixed. Instead of that, for each of the subareas 2 and 3, the direction adjustment parameters $\Delta\omega_2$ and $\Delta\omega_3$ for determining the direction of the entire subarea are optimized. Using these direction adjustment parameters $\Delta\omega_2$ and $\Delta\omega_3$, the horizontal orientation directions $\omega_i$ (i=4 to 9) of the cells are updated for the subareas 2 and 3 other than the featured subarea 1. For example, the horizontal orientation directions $\omega_4$, $\omega_5$, $\omega_6$ of the cells 4 to 6 included in the subarea 2 are updated to $\omega_{4,NEW}$, $\omega_{5,NEW}$, $\omega_{6,NEW}$ in the following equation (1), and the horizontal orientation directions $\omega_7$, $\omega_8$, $\omega_9$ of the cells 7 to 9 included in the subarea 3 are updated to $\omega_{7,NEW}$, $\omega_{8,NEW}$, $\omega_{9,NEW}$ in the following equation (2).

$$\omega_{4,NEW} = \omega_4 + \Delta\omega_2, \omega_{5,NEW} = \omega_5 + \Delta\omega_2, \omega_{6,NEW} = \omega_6 + \Delta\omega_2 \quad (1)$$

$$\omega_{7,NEW} = \omega_7 + \Delta\omega_3, \omega_{8,NEW} = \omega_8 + \Delta\omega_3, \omega_{9,NEW} = \omega_9 + \Delta\omega_3 \quad (2)$$

Similarly, in the case of optimizing the antenna parameters for the subarea 2 including the cells 4 to 6, the antenna parameters of the remaining subareas 1 and 3 are fixed, and the direction adjustment parameters $\Delta\omega_1$ and $\Delta\omega_3$ for determining the direction of the entire subarea of each of the subareas 1 and 3 are optimized. Further, in the case of optimizing the antenna parameters for the subarea 3 including the cells 7 to 9, the antenna parameters of the remaining subareas 1 and 2 are fixed, and the direction adjustment parameters $\Delta\omega_1$ and $\Delta\omega_2$ for determining the direction of the entire subarea of each of the subareas 1 and 2 are optimized.

Considering that each of the subareas influences each other, the direction adjustment parameters $\Delta\omega_1$, $\Delta\omega_2$, and $\Delta\omega_3$ are additional parameters for simultaneously adjusting the directions of the remaining subareas other than the target subarea when optimizing the antenna parameters.

In case that the area 20A is divided into the three subareas 1 to 3, the number of antenna parameters included in each of the subareas become twelve as shown in FIG. 7. That is, the number of antenna parameters to be optimized per one time can be reduced from 4N for the entire area 20A to 4(N/M)+M−1 for each of the subareas. Therefore, it is possible to greatly reduce the amount of calculation for optimization per one time.

Figure 8:
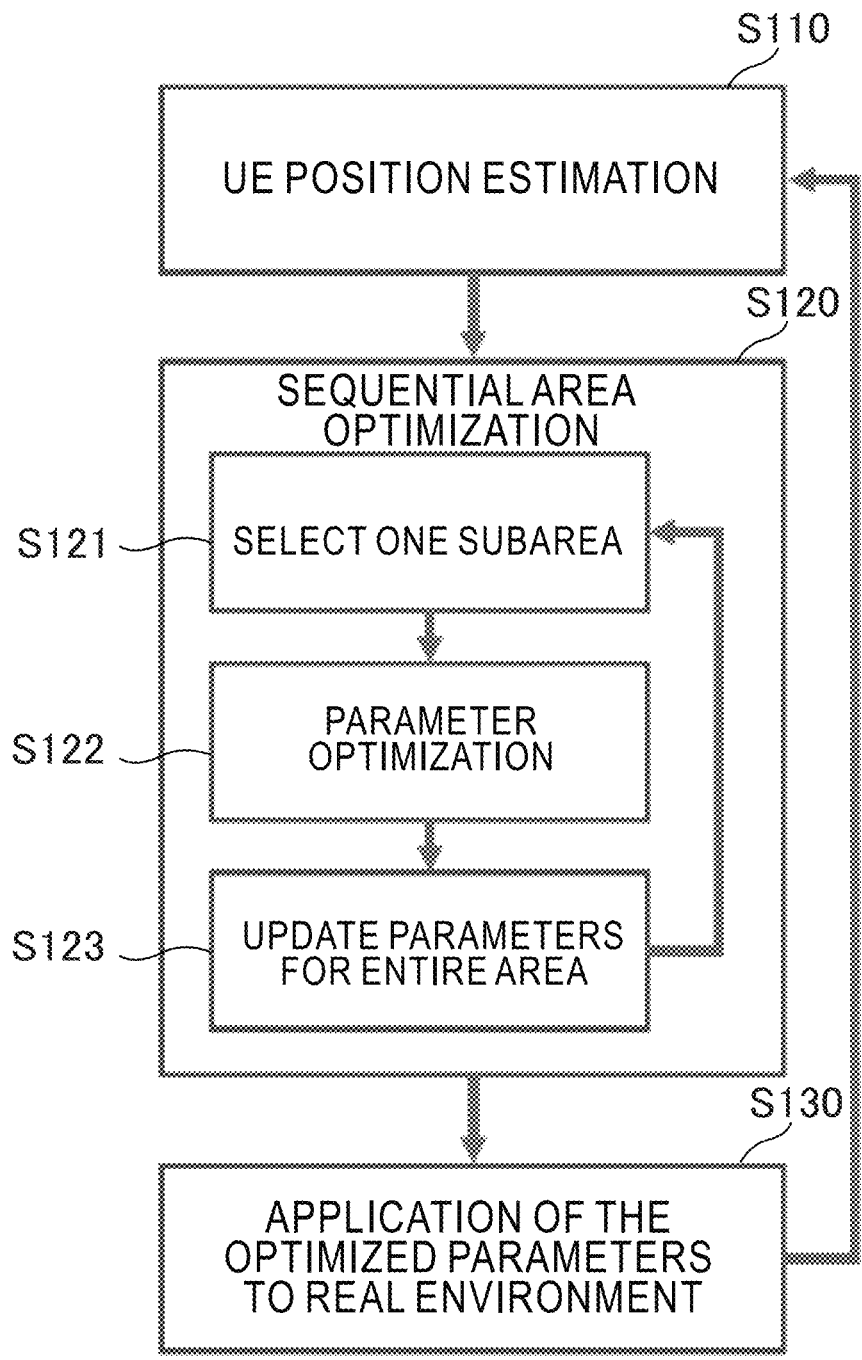
FIG. 8 is a flowchart showing an example of dynamic area control according to an embodiment.

FIG. 8 is a flowchart showing an example of dynamic area control in the HAPS 20 according to the embodiment. FIG. 9A to FIG. 9C are illustrations showing respectively an example of switching subareas that are targeted for optimization of antenna parameters in the dynamic area control of FIG. 8. In FIG. 8, the dynamic area control includes a UE position-estimation step (S110), a sequential-area optimization step (S120), and a parameter application step for applying the optimized parameters to the real environment (S130).

In the UE position-estimation step (S110), the position of each UE 61 in the area 20A is estimated by some method, and the estimation result (for example, the coordinate data of the position of each UE 61) is outputted. The position of each UE 61 can be estimated using, for example, GNSS position information or an MR (Measurement Report) fed back from each UE 61.

Next, in the sequential-area optimization step (S120), the estimation result of the position of each UE 61 outputted in the UE position-estimation step (S110) (for example, the coordinate data of the position of each UE 61) is inputted, and the optimal value of the antenna parameters of each cell, which are optimized for each of the subareas, is outputted. For example, the area 20A of N cells is divided into M subareas and the optimization for each of the subareas is sequentially performed by the following procedure.

First, one subarea (for example, subarea 20S(1) in FIG. 9A) is selected from among the divided M subareas (S121).

Next, the forgoing total of 4 (N/M)+M−1 antenna parameters are optimized by a genetic algorithm or the like (S122).

Next, the values of the antenna parameters for the entire area 20A are updated with the optimized parameter values (S123).

Next, the processes of S121 to S123 are repeated for the remaining subareas (for example, the subarea 20S(2) in FIG. 9B and the subarea 20S(3) in FIG. 9C). Further, the processes of S121 to S123 are repeated T times (T≥1) for all subareas. As a result, the processes of S121 to S123 are eventually repeated M×T times (T≥1).

In the parameter application step (S130), the updated final values of the antenna parameter of each cell in the area 20A after completing the sequential-area optimization step (S120) are applied as control setting values of the SL antenna 211 in the communication relay station of the real environment.

It is noted that the dynamic area control exemplified in FIG. 8 and FIG. 9A to FIG. 9C may be performed periodically (for example, periodic timing every hour or every two hours), or may be performed each time when occurring a significant change in the UE distribution in the area 20A (for example, at the timing when the amount of change in the number of UEs in a predetermined monitoring area exceeds a predetermined threshold value).

It is noted that the number and method for dividing the service area 20A in the dynamic area control may be determined according to the number, size, shape, etc. of the cells included in the service area 20A.

Each of FIG. 10A to FIG. 10C is an illustration showing another example of area division for dividing the service area 20A into plural subareas. In the example of FIG. 10A, twelve cells are formed, which are radially extending in the service area 20A, and the service area 20A is divided into three subareas so that each subarea includes four cells. In the example of FIG. 10B, twenty-one cells are formed concentrically in three rows in the service area 20A having a multi-layered cell structure, and the service area 20A is divided into three subareas so that each subarea includes seven cells.

It is noted that, in order to make each of the subareas the same size, although the total number N of cells in the service area 20A must be divisible by the number of subareas (number of divisions of the service area 20A) M, the number of cells for each of the all subareas does not necessarily have to be the same.

For example, in the example of FIG. 10C, by dividing the service area 20A having a multi-layered cell structure into three in the circumferential direction and into two in the radial direction, the service area 20A is divided into a total of six multi-layered subareas 20S(1) to 20S(6). In this case, the number of antenna parameters required for the dynamic area control differs depending on the number of cells in the subarea. For example, in FIG. 10C, the number of (the number of kinds of) antenna parameters to be optimized at one time is seventeen (=4×3+6−1) in each of the inner subareas 20S(1) to 20S(3), and the number of (the number of kinds of) antenna parameters to be optimized at one time is twenty-one (=4×4+6−1) in each of the outer subareas 20S(4) to 20S(6).

As described above, according to the present embodiment, it is possible to perform the dynamic area control capable of coping with a change of distribution of the UEs 61 in the service area 20A configured with plural cells formed toward the ground, and to suppress an increase of time required for the area optimization.

It is noted that, the process steps and configuration elements of the relay communication station of the communication relay apparatus such as HAPS, the feeder station, the gateway station, the remote control apparatus, the server, the terminal apparatus (user apparatus, mobile station, communication terminal), the base station and the base station apparatus described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, gateway station, base station, base station apparatus, radio-relay station apparatus, terminal apparatus (user apparatus, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented in the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

20: HAPS (communication relay apparatus)
20A: service area
20C: cell
20F: footprint
20S: subarea
21: relay communication station
60: UE high-density section
61: UE (terminal apparatus)
70: GW station
80: base station apparatus
90: mobile communication network
95: remote control apparatus
211: antenna for service link (SL antenna)
212: antenna for feeder link (FL antenna)

The invention claimed is:

1. An aerial-staying type communication relay apparatus having a relay communication station for relaying radio communication of terminal apparatuses located in plural (N) cells formed toward a service area on a ground and an antenna for service link, the communication relay apparatus comprising:
    position estimation means for estimating positions of plural terminal apparatuses located in the service area;
    parameter optimization means for dividing the service area into plural (M) subareas totally including plural (N) cells, and, for each of the plural (M) subareas, optimizing by determining optimum values of plural (L) kinds of antenna parameters ($\theta_{tilt}$, $\theta_{3dB}$, $\Phi_{3dB}$, $\omega$) of the antenna for service link of the plural (N/M) cells included the subarea while values of the plural antenna parameters ($\theta_{tilt}$, $\theta_{3dB}$, $\Phi_{3dB}$, $\omega$) for the plural cells included in each of the remaining subareas are fixed, based on estimation results of the positions of plural terminal apparatuses; and parameter application means for applying, to the antenna for service link, the optimum values of the plural (L) kinds of antenna parameters ($\theta_{tilt}$, $\theta_{3dB}$, $\Phi_{3dB}$, $\omega$) after the optimization for each of the plural cells is completed for all of the plural (M) subareas, and wherein the plural (L) kinds of antenna parameters include:
- a tilt angle ($\theta_{tilt}$) that is an angle from a horizontal direction (H) of a vector (Vc) from the antenna for service link toward the center of the cell,
- a vertical half width ($\theta_{3dB}$) that is an angular width between two points at which gain of a beam of the antenna is reduced by 3 dB from the maximum gain at the center of a main beam in a vertical plane (Pv) including the vector (Vc) toward the center of the cell,
- a horizontal half width ($\Phi_{3dB}$) that is an angular width between two points at which the gain of a beam of the antenna is reduced by 3 dB from a maximum gain at the center of a main beam in a horizontal plane ($P_H$) including the vector (Vc) toward the center of the cell, and
- a cell horizontal orientation direction ($\omega$) that is an angle in a direction passing through the center of the cell from a reference point with reference to a predetermined reference horizontal direction (Hs), in a horizontal plane including a position of the antenna as a reference point, and wherein the parameter optimization means:
sequentially selects each of the plural (M) subareas, and optimizes the values of the plural (L) kinds of antenna parameters ($\theta_{tilt}$, $\theta_{3dB}$, $\Phi_{3dB}$, $\omega$) for each of the plural cells included in the selected subarea and optimizes values of direction adjustment parameters ($\Delta\omega$) for adjusting the cell horizontal orientation directions ($\omega$) of other subareas other than the selected subarea, based on the estimation results of the positions of plural terminal apparatuses.

2. The communication relay apparatus according to claim 1,
wherein the parameter optimization means performs the parameter optimization for each subarea plural times (T times) repeatedly.

3. The communication relay apparatus according to claim 1,
wherein the communication relay apparatus performs the position estimation for the plural terminal apparatuses, the optimization for the antenna parameters ($\theta_{tilt}$, $\theta_{3dB}$, $\Phi_{3dB}$, $\omega$) and the application for the optimum values of the antenna parameters ($\theta_{tilt}$, $\theta_{3dB}$, $\Phi_{3dB}$, $\omega$) to the antenna for service link, periodically or when an amount of change in the distribution of the terminal apparatuses in the service area becomes larger than a predetermined amount of change.

4. A remote control apparatus capable of communicating with an aerial-staying type communication relay apparatus having a relay communication station for relaying radio communication of terminal apparatuses located in plural (N) cells formed toward a service area on aground and an antenna for service link, the remote control apparatus comprising:

position estimation means for estimating positions of plural terminal apparatuses located in the service area;

parameter optimization means for dividing the service area into plural (M) subareas totally including plural (N) cells, and, for each of the plural (M) subareas, optimizing by determining optimum values of plural (L) kinds of antenna parameters ($\theta_{tilt}$, $\theta_{3dB}$, $\Phi_{3dB}$, $\omega$) of the antenna for service link of the plural (N/M) cells included the subarea while values of the plural antenna parameters ($\theta_{tilt}$, $\theta_{3dB}$, $\Phi_{3dB}$, $\omega$) for the plural cells included in each of the remaining subareas are fixed, based on estimation results of the positions of plural terminal apparatuses; and parameter transmission means for transmitting, to the communication relay apparatus, the optimum values of the plural (L) kinds of antenna parameters ($\theta_{tilt}$, $\theta_{3dB}$, $\Phi_{3dB}$, $\omega$) after the optimization for each of the plural cells completed for all of the plural (M) subareas, and wherein the plural (L) kinds of antenna parameters include:
- a tilt angle ($\theta_{tilt}$) that is an angle from a horizontal direction (H) of a vector (Vc) from the antenna for service link toward the center of the cell,
- a vertical half width ($\theta_{3dB}$) that is an angular width between two points at which gain of a beam of the antenna is reduced by 3 dB from the maximum gain at the center of a main beam in a vertical plane ($P_v$) including the vector (Vc) toward the center of the cell,
- a horizontal half width $\Phi_{3dB}$) that is an angular width between two points at which the gain of a beam of the antenna is reduced by 3 dB from a maximum gain at the center of a main beam in a horizontal plane ($P_H$) including the vector (Vc) toward the center of the cell, and
- a cell horizontal orientation direction (w) that is an angle in a direction passing through the center of the cell from a reference point with reference to a predetermined reference horizontal direction (Hs), in a horizontal plane including a position of the antenna as a reference point, and wherein the parameter optimization means:
sequentially selects each of the plural (M) subareas, and optimizes the values of the plural (L) kinds of antenna parameters ($\theta_{tilt}$, $\theta_{3dB}$, $\Phi_{3dB}$, $\omega$) for each of the plural cells included in the selected subarea and optimizes values of direction adjustment parameters ($\Delta\omega$) for adjusting the cell horizontal orientation directions ($\omega$) of other subareas other than the selected subarea, based on the estimation results of the positions of plural terminal apparatuses.

5. The remote control apparatus according to claim 4,
wherein the parameter optimization means performs the parameter optimization for each subarea plural times (T times) repeatedly.

6. The remote control apparatus according to claim 4,
wherein the remote control apparatus performs the position estimation for the plural terminal apparatuses, the optimization for the antenna parameters ($\theta_{tilt}$, $\theta_{3dB}$, $\Phi_{3dB}$, $\omega$) and the application for the optimum values of the antenna parameters ($\theta_{tilt}$, $\theta_{3dB}$, $\Phi_{3dB}$, $\omega$) to the antenna for service link, periodically or when an amount of change in the distribution of the terminal apparatuses in the service area becomes larger than a predetermined amount of change.

7. A system comprising:
the remote control apparatus according to claim 4; and
the aerial-staying type communication relay apparatus.

8. An area control method for a service area configured with plural (N) cells formed toward a ground from an aerial-staying type communication relay apparatus having a relay communication station for relaying radio communication of terminal apparatuses located in plural (N) cells formed toward a service area on a ground and an antenna for service link, the area control method comprising:
estimating positions of plural terminal apparatuses located in the service area;
dividing the service area into plural (M) subareas that totally includes plural (N) cells respectively, and, for each of the plural (N) subareas, optimizing by determining optimum values of plural (L) kinds of antenna parameters ($\theta_{tilt}$, $\theta_{3dB}$, $\Phi_{3dB}$, $\omega$) of the antenna for service link of the plural (N/M) cells included the subarea while values of the plural antenna parameters ($\theta_{tilt}$, $\theta_{3dB}$, $\Phi_{3dB}$, $\omega$) for the plural cells included in each of the remaining subareas are fixed, based on estimation results of the positions of plural terminal apparatuses; and
applying, to the antenna for service link, the optimum values of the plural (L) kinds of antenna parameters ($\theta_{tilt}$, $\theta_{3dB}$, $\Phi_{3dB}$, $\omega$) after the optimization for each of the plural cells is completed for all of the plural (M) subareas, and
wherein the plural (L) kinds of antenna parameters include:
a tilt angle ($\theta_{tilt}$) that is an angle from a horizontal direction (H) of a vector (Vc) from the antenna for service link toward the center of the cell,
a vertical half width ($\theta_{3dB}$) that is an angular width between two points at which gain of a beam of the antenna is reduced by 3 dB from the maximum gain at the center of a main beam in a vertical plane ($P_v$) including the vector (Vc) toward the center of the cell,
a horizontal half width ($\Phi_{3dB}$) that is an angular width between two points at which the gain of a beam of the antenna is reduced by 3 dB from a maximum gain at the center of a main beam in a horizontal plane ($P_H$) including the vector (Vc) toward the center of the cell, and
a cell horizontal orientation direction ($\omega$) that is an angle in a direction passing through the center of the cell from a reference point with reference to a predetermined reference horizontal direction (Hs), in a horizontal plane including a position of the antenna as a reference point, and
wherein the method comprises:
sequentially selecting each of the plural (M) subareas, and
optimizing by determining the values of the plural (L) kinds of antenna parameters ($\theta_{tilt}$, $\theta_{3dB}$, $\Phi_{3dB}$, $\omega$) for each of the plural cells included in the selected subarea and optimizing by determining values of direction adjustment parameters ($\Delta\omega$) for adjusting the cell horizontal orientation directions ($\omega$) of other subareas other than the selected subarea, based on the estimation results of the positions of plural terminal apparatuses.

9. A non-transitory computer readable medium containing software that is executed by a computer or processor provided in an aerial-staying type communication relay apparatus having a relay communication station for relaying radio communication of terminal apparatuses located in plural (N) cells formed toward a service area on a ground and an antenna for service link, the software comprising:
executable code that estimates positions of plural terminal apparatuses located in the service area;
executable code that divides the service area into plural (M) subareas totally including plural (N) cells, and, for each of the plural (N) subareas, optimizes by determining optimum values of plural (L) kinds of antenna parameters ($\theta_{tilt}$, $\theta_{3dB}$, $\Phi_{3dB}$, $\omega$) of the antenna for service link of the plural (N/M) cells included the subarea while values of the plural antenna parameters ($\theta_{tilt}$, $\theta_{3dB}$, $\Phi_{3dB}$, $\omega$) for the plural cells included in each of the remaining subareas are fixed, based on estimation results of the positions of plural terminal apparatuses; and
executable code that applies, to the antenna for service link, the optimum values of the plural (L) kinds of antenna parameters ($\theta_{tilt}$, $\theta_{3dB}$, $\Phi_{3dB}$, $\omega$) after the optimization for each of the plural cells is completed for all of the plural (M) subareas, and
wherein the plural (L) kinds of antenna parameters include:
a tilt angle ($\theta_{tilt}$) that is an angle from a horizontal direction (H) of a vector (Vc) from the antenna for service link toward the center of the cell,
a vertical half width ($\theta_{3dB}$) that is an angular width between two points at which gain of a beam of the antenna is reduced by 3 dB from the maximum gain at the center of a main beam in a vertical plane ($P_v$) including the vector (Vc) toward the center of the cell,
a horizontal half width ($\Phi_{3dB}$) that is an angular width between two points at which the gain of a beam of the antenna is reduced by 3 dB from a maximum gain at the center of a main beam in a horizontal plane ($P_H$) including the vector (Vc) toward the center of the cell, and
a cell horizontal orientation direction ($\omega$) that is an angle in a direction passing through the center of the cell from a reference point with reference to a predetermined reference horizontal direction (Hs), in a horizontal plane including a position of the antenna as a reference point, and
wherein the software comprises:
executable code that sequentially selects each of the plural (M) subareas, and
executable code that optimizes by determining the values of the plural (L) kinds of antenna parameters ($\theta_{tilt}$, $\theta_{3dB}$, $\Phi_{3dB}$, $\omega$) for each of the plural cells included in the selected subarea and optimizes by determining values of direction adjustment parameters ($\Delta\omega$) for adjusting the cell horizontal orientation directions ($\omega$) of other subareas other than the selected subarea, based on the estimation results of the positions of plural terminal apparatuses.

10. A non-transitory computer readable medium containing software that is executed by a computer or processor provided in a remote control apparatus capable of communicating with an aerial-staying type communication relay apparatus having a relay communication station for relaying radio communication of terminal apparatuses located in plural (N) cells formed toward a service area on a ground and an antenna for service link, the software comprising:

executable code that estimates positions of plural terminal apparatuses located in the service area;

executable code that divides the service area into plural (M) subareas totally including plural (N) cells, and, for each of the plural (N) subareas, optimizes by determining optimum values of plural (L) kinds of antenna parameters ($\theta_{tilt}$, $\theta_{3dB}$, $\Phi_{3dB}$, $\omega$) of the antenna for service link of the plural (N/M) cells included the subarea while values of the plural antenna parameters ($\theta_{tilt}$, $\theta_{3dB}$, $\Phi_{3dB}$, $\omega$) for the plural cells included in each of the remaining subareas are fixed, based on estimation results of the positions of plural terminal apparatuses; and executable code that transmits, to the communication relay apparatus, the optimum values of the plural (L) kinds of antenna parameters ($\theta_{tilt}$, $\theta_{3dB}$, $\Phi_{3dB}$, $\omega$) after the optimization for each of the plural cells is completed for all of the plural (M) subareas, and wherein the plural (L) kinds of antenna parameters include:
- a tilt angle ($\theta_{tilt}$) that is an angle from a horizontal direction (H) of a vector (Vc) from the antenna for service link toward the center of the cell,
- a vertical half width ($\theta_{3dB}$) that is an angular width between two points at which gain of a beam of the antenna is reduced by 3 dB from the maximum gain at the center of a main beam in a vertical plane ($P_v$) including the vector (Vc) toward the center of the cell,
- a horizontal half width ($\Phi_{3dB}$) that is an angular width between two points at which the gain of a beam of the antenna is reduced by 3 dB from a maximum gain at the center of a main beam in a horizontal plane ($P_H$) including the vector (Vc) toward the center of the cell, and
- a cell horizontal orientation direction ($\omega$) that is an angle in a direction passing through the center of the cell from a reference point with reference to a predetermined reference horizontal direction (Hs), in a horizontal plane including a position of the antenna as a reference point, and wherein the software comprises:
executable code that sequentially selects each of the plural (M) subareas, and executable code that optimizes by determining the values of the plural (L) kinds of antenna parameters ($\theta_{tilt}$, $\theta_{3dB}$, $\Phi_{3dB}$, $\omega$) for each of the plural cells included in the selected subarea and optimizes by determining values of direction adjustment parameters ($\Delta\omega$) for adjusting the cell horizontal orientation directions ($\omega$) of other subareas other than the selected subarea, based on the estimation results of the positions of plural terminal apparatuses.

11. The communication relay apparatus according to claim 2,
wherein the communication relay apparatus performs the position estimation for the plural terminal apparatuses, the optimization for the antenna parameters ($\theta_{tilt}$, $\theta_{3dB}$, $\Phi_{3dB}$, $\omega$) and the application for the optimum values of the antenna parameters ($\theta_{tilt}$, $\theta_{3dB}$, $\Phi_{3dB}$, $\omega$) to the antenna for service link, periodically or when an amount of change in the distribution of the terminal apparatuses in the service area becomes larger than a predetermined amount of change.

12. The remote control apparatus according to claim 5,
wherein the remote control apparatus performs the position estimation for the plural terminal apparatuses, the optimization for the antenna parameters ($\theta_{tilt}$, $\theta_{3dB}$, $\Phi_{3dB}$, $\omega$) and the application for the optimum values of the antenna parameters ($\theta_{tilt}$, $\theta_{3dB}$, $\Phi_{3dB}$, $\omega$) to the antenna for service link, periodically or when an amount of change in the distribution of the terminal apparatuses in the service area becomes larger than a predetermined amount of change.

13. The non-transitory computer readable medium according to claim 10,
wherein the remote control apparatus performs the position estimation for the plural terminal apparatuses, the optimization for the antenna parameters ($\theta_{tilt}$, $\theta_{3dB}$, $\Phi_{3dB}$, $\omega$) and the application for the optimum values of the antenna parameters ($\theta_{tilt}$, $\theta_{3dB}$, $\Phi_{3dB}$, $\omega$) to the antenna for service link, periodically or when an amount of change in the distribution of the terminal apparatuses in the service area becomes larger than a predetermined amount of change.

* * * * *